United States Patent Office 3,806,486
Patented Apr. 23, 1974

3,806,486
POLYURETHANE ADHESIVE AND METHOD FOR ADHERING NATURAL AND SYNTHETIC RUBBER TO OTHER SURFACES
Gerhard Endriss and Heinz Libossek, Munich, and Abbas Farzaneh, Ampfing, Germany, assignors to Isar-Rakoll Chemie G.m.b.H., Munich, Germany
No Drawing. Filed Mar. 20, 1972, Ser. No. 236,447
Claims priority, application Germany, Mar. 20, 1971, P 21 13 631.2
Int. Cl. B44d 5/04; C08g 51/36; C09j 5/02
U.S. Cl. 260—31.2 N
4 Claims

ABSTRACT OF THE DISCLOSURE

Adhesives, adaptable to adhering vulcanized natural and synthetic rubbers, comprising a solution, in a volatile inert organic solvent, of a predominantly linear polyurethane and a small amount of a carboxylic acid.

Method of adhering such rubbers with such adhesives.

Method of adhering such rubbers with an adhesive solution of a predominantly linear polyurethane in a volatile inert organic solvent after pre-treatment of the rubber with a solution of a carboxylic acid in a volatile inert organic solvent.

---

The present invention relates to modified polyurethane adhesives adaptable to adhering filled or transparent vulcanized natural or synthetic rubbers, and to methods of adhering such rubbers.

Adhesives comprising polyurethanes are widely employed to bond leathers having a high proportion of extractable material, or to bond materials comprising polyvinyl chloride or a polyurethane, to themselves or to each other. These adhesives have the high adhesion necessary for practical use with soft PVC, polyurethane, and highly fatty leather.

However, the adhesion of filled or transparent vulcanized natural or synthetic rubbers (hereinafter referred to as "rubber") to various other materials with polyurethane adhesives alone has heretofore been unsatisfactory or impossible in many cases. This is evident, for example, from the article by Fisher in "Schuhtechnik," No. 12, page 1945 (1970), where it is taught: "According to the present state of the art, there appears to be no possibility on the part of the adhesives industry of preparing adhesives which show a faultless adhesion to an sole materials now in use and which in the same degree give a sufficient bond to the synthetic materials now used in uppers and to PVC materials. For this reason there has been no lack of attempts to solve this problem in other ways."

Thus, for example, varying the composition of rubber mixtures has been tried in order to increase adhesion with polyurethane adhesives to a point which will meet requirements. In addition to increasing the cost of the rubber mixtures, however, the claims made for the materials cannot be realized.

In the same fashion, the addition of isocyanates of differing chemical structures or in differing amounts has been tried for improving adhesion, without a satisfactory improvement.

The addition of natural or synthetic resins to polyurethane adhesive to improve their adhesion to vulcanized rubber fails primarily because of the incompatibility of the resins with the polyurethane solution, or because the resins promote the migration of plasticizers, such as fatty oils, out of polyvinyl chloride or leather to be adhered to the rubber.

The proposal that rubber pieces which are to be adhered be treated, at least in the region of adhesion, with oxidizing acids, or that they be halogenated with chlorine or bromine, or that they be treated with sulfuryl chloride, in order to chemically alter the surface of the material, can only be realized with difficulty in practice since the use of these materials demands special precautionary measures in addition to increasing the cost of the product, and the desired result does not occur in all cases.

An alteration of the rubber surface by the covulcanization and subsequent removal of textiles or wire webs also does not give satisfactory results.

The use of primer coatings, for example those comprising polychloropropylene, on rubber introduces the danger of a separation between the primer coating and the polyurethane resin as well as consuming time which results in an increase in the cost of the final product.

The attempt to unite a polychloroprene film to rubber on one side, with a polyurethane film on the other side, has led to considerable difficulties in practice. This adhesive method which has been introduced into the shoe industry can only be carried out with two different adhesives particularly chosen with respect to each other and raises a number of problems such as an exact dosing of the adhesive amounts applied, observance of the drying time, and a reduction in the shelf life of pre-treated rubber soles. The problem of plasticizer migration in the polychloroprene adhesive cannot, also, be excluded with certainty in this technique.

In all the adhesive procedures described above, a roughening of the vulcanized rubber surface and the immediate application of adhesive as protection against oxidation of the roughened surface are unavoidably necessary. Mechanical roughening is a complex additional procedure which in many cases is made very difficult or cannot be carried out because of the form of the rubber part. No permanent bond has heretofore been obtained with polyurethane adhesives on vulcanized rubber mixtures which are split and then stored for a long period, or on unroughened materials which are free of release agents.

According to the present invention, the disadvantages of the known adhesives and adhesive techniques are overcome.

The adhesives according to the invention, which are suitable for the adhesion of vulcanized natural or synthetic rubbers to other materials, primarily plasticized polyvinyl chloride and polyurethane, comprise a predominantly linear polyurethane combined with from about 0.05 to about 25 percent, preferably from 0.5 to 5 percent, by weight of the polyurethane, of one or more carboxylic acids which may be substituted with hydroxy groups, keto groups, or halogen atoms, particularly chlorine atoms.

The use of predominantly linear polyurethanes, or more exactly polyester urethanes, for the preparation of adhesives is known in the art. These materials are addition products of linear polyesters having terminal hydroxy groups and diisocyanates, particularly aromatic diisocyanates. The polyesters are polycondensation products of dicarboxylic acids and an excess of diols, or are polymerization products of lactones, such as caprolactone. Linear polyurethanes particularly suitable for use according to the present invention are described, for example, in German patent publication 1,256,882, teaching polyurethanes prepared from diisocyanates and esters formed between alkanedicarboxylic acids having at least 6 carbon atoms and alkanediols having at least 4 carbon atoms. Both aliphatic and aromatic diisocyanates can be employed, such as 1,6-hexamethylene diisocyanate, 4,4'-diphenylmethane diisocyanate, and—preferably—toluene diisocyanate. Suitable acids include adipic, pimelic, suberic, azelaic, and sebacic acids. Preferred alkanediols are, for example, butanediol-1,4, pentanediol-1,5, and hexanediol-1,6. Other predominantly linear polyurethanes are taught in the work of E. Mueller on "The Structure of Urethane Elastomers" in "Angewandte Makromolekular-Chemie" 14, 75–86 (1970).

The carboxylic acids to be employed in the polyurethane adhesives modified according to the invention may be saturated or unsaturated aliphatic, cycloaliphatic, or aromatic acids, or mixtures thereof. They can be mono- or poly-carboxylic acids and may optionally contain hydroxy groups, keto groups, or halogen atoms, particularly chlorine atoms, in addition to the carboxy groups. Exemplary of such materials are: oxalic acid, fumaric acid, tartaric acid, trichloroacetic acid, malic acid, malonic acid, gallic acid, acetylene dicarboxylic acid, pyromellitic acid, glycollic acid, mesoxalic acid, and tartronic acid; also pyruvic acid, suberic acid, isophthalic acid, trimellitic acid, benzoic acid, and dichloroacetic acid.

In place of the free acids, acid chlorides such as acetyl chloride or benzoyl chloride can optionally be employed. However, when modifying agents are employed which on long storage could cause a certain decrease in the viscosity of the adhesive mixture, for example acid chlorides, it is recommended that such materials be added only shortly before final processing.

The adhesive solutions of the invention can be prepared in a variety of inert organic solvents which are volatile at room temperature, including aromatic hydrocarbons such as benzene, toluene, and the xylenes; esters such as ethyl-, propyl-, and butyl-acetates; and ketones such as acetone, methyl ethyl ketone, and methyl isobutyl ketone (as an additive). The concentration of the solution may be between 5 and 30 percent by weight, and is conveniently between 15 and 20 percent.

Fillers, dyes, extenders such as chlorinated rubber or post-chlorinated vinyl acetate polymers, and resins such as ketone resins which vary the adhesiveness can be added to the adhesive solutions of the invention in conventional fashion.

Those materials whose adhesion is improved by use of the polyurethane adhesives modified according to the present invention include vulcanizates of natural or synthetic rubber, or mixtures of these with reclaimed materials. The synthetic rubbers include the various copolymers of butadiene with styrene, acrylonitrile, and/or isobutylene, as well as poly-cis-isoprene and poly-cis-butadiene.

The adhesion techniques now employed in practice—i.e. application of adhesive to both of the pieces to be adhered, evaporation of solvent, joinder—can also be used when employing the adhesives modified according to the present invention. The adhesion process is simplified. Peel strength measurements following DIN 53274, on bonds made to the most diverse commercially available rubber materials with the adhesives according to the present invention give considerably higher values than are obtained with unmodified polyurethane solutions. The permanence of the bond is considerably increased, also with regard to dynamic continuous loading of the adhered pieces.

A further embodiment of the present invention involves the addition of a polyisocyanate to the adhesive solution before application in an amount from about 15 to about 50 percent, by weight of polyurethane in the solution. As polyisocyanates which can be added to the adhesive solution, triisocyanates, such as triphenylmethane-4,4',4''-triisocyanate or trifunctional isocyanates prepared by the reaction of one mol of a triol such as trimethylolpropane with three mols of a diisocyanate such as tolulylene diisocyanate, are preferred.

In a process variant according to the present invention, an organic carboxylic acid is not added to the adhesive but is rather used to pre-treat the rubber to be adhered. More in detail, the rubber is treated for a short time, preferably one to two minutes, with a solution of the carboxylic acid in a concentration of 0.1 to 10 percent by weight, particularly 0.1 to 3 percent by weight, and is then dried. This pre-treatment of the rubber with the organic acid solution can be by coating or dipping. The organic acids are preferably used in this case as a dilute solution. Alcohols such as methyl alcohol, ethyl alcohol, isopropyl alcohol; ketones, such as acetone and methyl ethyl ketone; and esters such as ethyl acetate are preferred as solvents.

A better understanding of the present invention and of its many advantages will be had by referring to the following specific examples, given by way of illustration.

In the following examples, which demonstrate the superior properties of the adhesives of the present invention, commercial polyurethane adhesives have been used as a base material. These commercial products are polyester urethanes, i.e. polyaddition products comprising (a) polyesters containing hydroxy groups and prepared from aliphatic dicarboxylic acids, particularly adipic acid, and diols, particularly butane diol and/or hexane diol; and (b) aromatic diisocyanates, particularly 2,6-toluene diisocyanate (optionally in admixture with the 2,4-isomer) and/or 4,4'-diphenylmethane diisocyanate.

Twenty percent solutions of these polyurethanes in methyl ethyl ketone were prepared and the carboxylic acids employed in the various examples were added thereto. The drying time given in the examples is not critical but is chosen for uniformity. Similarly, although the adhesives of the examples are activated by warming, this is an optional step.

EXAMPLES 1–4

20 percent solutions of commercial polyurethanes in methyl ethyl ketone were employed as a base. In each case, 2.5 percent, by weight of the polyurethane, of fumaric acid was added to the solutions. The adhesive was applied to a vulcanizate of styrene/butadiene rubber employed in the shoe industry for soles. According to conventional practice, the part to be adhered was first roughened with coarse sandpaper. The air-drying time after application of the adhesive was 30 minutes. The adhesive film was then warmed to a temperature of about 70° C. The parts to be adhered were joined and compressed. The samples were stored for three days and thereafter the splitting strength of the joint was measured at 20° C. The results are presented in Table I.

TABLE I

| Polyurethane | Resistance to separation (kgf./cm.) | |
|---|---|---|
| | Without additive | With additive |
| Example: | | |
| 1 — "Desmocoll 400" (Bayer) | 4.0 | 14.5 |
| 2 — "Desmocoll 420" (Bayer) | 6.6 | 15.1 |
| 3 — "Estane 5712 F2" (Goodrich) | 7.1 | 10.2 |
| 4 — "Elastostic 2005" (polyurethangesellshaft) | 8.9 | 11.5 |

EXAMPLES 5–32

Proceeding as in Examples 1–4, adhesive bonds were made on a test rubber, "Noratest" (Freudenberg, Weinheim, Germany) using a 20 percent solution of a commercial polyurethane in methyl ethyl ketone with a carboxylic acid additive as shown in following Table II. In each case, the amount of acid added was 2.5 percent, by weight of the polyurethane, with the exception of Example 21, for which the acid was present in an amount of 25 percent by weight. The polyurethane was "Desmocoll 400" (Bayer). As in the earlier examples, the air-drying time after application of the adhesive was 30 minutes, the activation time was one minute, and the samples were stored for three days.

TABLE II

| Example | Acid additive | Resistance to separation (kgf./cm.) |
|---|---|---|
| Comparison example. | None | 5.3 |
| 5 | Formic acid | 8.0 |
| 6 | Oxalic acid | 13.4 |
| 7 | Malonic acid | 13.4 |
| 8 | Succinic acid | 8.3 |
| 9 | Adipic acid | 8.7 |
| 10 | Pimelic acid | 9.0 |
| 11 | Suberic acid | 11.8 |
| 12 | Fumaric acid | 15.0 |
| 13 | Maleic acid | 10.2 |
| 14 | Glycollic acid | 12.5 |
| 15 | Malic acid | 12.1 |
| 16 | Tartaric acid | 13.7 |
| 17 | Citric acid | 9.5 |
| 18 | Tartronic acid | 13.0 |
| 19 | Mesoxalic acid | 13.5 |
| 20 | Pyruvic acid | 11.7 |
| 21 | Benzoic acid (25% by weight) | 13.1 |
| 22 | Phthalic acid | 8.4 |
| 23 | Isophthalic acid | 11.1 |
| 24 | Salicylic acid | 9.5 |
| 25 | Trimellitic acid | 10.2 |
| 26 | Pyromellitic acid | 14.3 |
| 27 | Gallic acid | 11.7 |
| 28 | Monochloracetic acid | 8.2 |
| 29 | Dichloracetic acid | 10.7 |
| 30 | Trichloracetic acid | 14.5 |
| 31 | Acetyl chloride | 11.2 |
| 32 | Acetylene dicarboxylic acid | 13.8 |

EXAMPLES 33–36

Examples 33–36 resemble Example 12, except that the amount of fumaric acid added was varied as shown in Table III. The amount of acid in percent are by weight of polyurethane in the adhesive solution.

TABLE III

| Example | Amount of fumaric acid (percent by weight) | Resistance to separation (kfg./cm.) |
|---|---|---|
| Comparison example | None | 5.3 |
| 33 | 0.05 | 8.3 |
| 34 | 0.25 | 12.5 |
| 35 | 2.5 | 15.0 |
| 36 | 25 | 14.5 |

EXAMPLES 37–45

The adhesive strengths attainable on vulcanized rubber bodies using polyurethane solutions containing 2.5 percent of fumaric acid, by weight of polyurethane, as an additive according to the present invention are demonstrated using a variety of vulcanized rubber materials of the type predominantly used in the shoe industry as material for soles. The test bodies were roughened before the application of adhesive, and the adhesive was applied according to Example 1. The polyurethane is that of Example 1. The increase in adhesive strength is clearly evident by a comparison of the values obtained with and without the additive according to the invention.

The results are set forth in Table IV.

TABLE IV

| Example | Rubber | Source | Resistance to separation (kgf./cm.) Without additive | With additive |
|---|---|---|---|---|
| 37 | "Noratest" | Freudenberg | 3.9 | 15.3 |
| 38 | "Noralitex 54-965" | do | 2.7 | 8.0 |
| 39 | Transparent rubber | Conti | 4.3 | ¹15.3 |
| 40 | "Contex" | do | 2.7 | 8.3 |
| 41 | "Thunit" | Westland | 1.1 | ¹5.1 |
| 42 | "Melangit," flax colored | Melangit | 4.0 | 12.0 |
| 43 | "Simcrepe" | Saargummi | 6.9 | 17.3 |
| 44 | "Odenwald SDP 80" | Odenwald | 3.8 | 12.0 |
| 45 | "Melangit" | Melangit | 6.0 | ¹11.8 |

¹ Failure of material.

EXAMPLES 46–49

The following examples illustrate the special embodiment of the invention in which a triisocyanate is added to the adhesive. The adhesion tests were carried out on unroughened vulcanized rubber bodies free of release agents. "Noratest" sheet material was employed for the preparation of the test bodies. Triphenylmethane-4,4',4''-triisocyanate was added in each case to the 20 percent polyurethane solutions reported in following Table V. After intimate admixture of the polyurethane solution and the isocyanate, adhesion followed as in Example 1.

TABLE V

| Example | Commercial polyurethane plus 25% isocyanate ¹ | Resistance to separation at 20° C. (kgf./cm.) Without addition of organic acid | With addition of 2.5% fumaric acid ¹ |
|---|---|---|---|
| 46 | "Desmocoll 400" (Bayer) | 2.1 | ²14.3 |
| 47 | "Desmocoll 420" (Bayer) | 1.6 | ²13.3 |
| 48 | "Estane 5712 F2" (Goodrich) | 1.7 | ²17.4 |
| 49 | "Elastostic 2005" (polyurethangesellschaft) | 2.0 | ²17.1 |

¹ By way of polyurethane.
² Failure of the material.

EXAMPLES 50–52

The following examples illustrate the increase in adhesion of polyurethane adhesives to rubber bodies which have been pre-treated with a 5 percent solution, in ethyl acetate, of an acid according to the invention. The rubber bodies were dipped for one minute in the acid solution and subsequently dried. Thereafter, the commercial polyurethane adhesive of Example 1 was applied and test bonds were made according to the method given in Example 1.

The results are reported in Table VI below:

TABLE VI

| Example | Pre-treatment | Resistance to separation (kgf./cm.) |
|---|---|---|
| Comparison example. | None | 3.4 |
| 50 | Fumaric acid solution | 10.7 |
| 51 | Oxalic acid solution | 9.4 |
| 52 | Tartaric acid solution | 10.2 |

What is claimed is:

1. An adhesive adaptable to the adhesion of vulcanized natural and synthetic rubbers, said adhesive comprising a solution prepared by mixing in an inert organic solvent volatile at room temperature (A) a predominantly linear polyurethane and (B) from about 0.05 to about 25 percent, by weight of said polyurethane, of at least one member selected from the group consisting of organic carboxylic acids and such acids containing at least one further functional group which is an hydroxy, keto, or halo group.

2. An adhesive as in claim 1 which additionally comprises from about 15 to about 50 percent, by weight of said polyurethane, of a polyisocyanate.

3. The method of adhering a vulcanized natural or synthetic rubber surface to another surface, which method comprises: (1) briefly treating the rubber surface with a dilute solution, in an organic solvent volatile at room temperature, of at least one member selected from the group consisting of organic carboxylic acids and such acids containing at least one further functional group which is an hydroxy, keto, or halo group; (2) drying the acid-treated surface without removing the acid; (3) applying an adhesive solution of a predominantly linear polyurethane in an inert organic solvent volatile at room temperature to the dried acid-treated surface and the other surface to be adhered; (4) drying the surfaces; and (5) joining the surfaces to be adhered under pressure.

4. A method as in claim 3 wherein said rubber surface is treated for about 1 to 2 minutes with a solution of said acid at a concentration of about 1 to about 10 percent by weight.

References Cited

UNITED STATES PATENTS

| | | | |
|---|---|---|---|
| 3,179,625 | 4/1965 | Ehrhart | 260—75 |
| 3,490,987 | 1/1970 | Bauriedel | 161—190 |
| 3,663,513 | 5/1972 | Kazama et al. | 260—75 NT |
| 2,929,800 | 3/1960 | Hill | 260—77.5 |
| 3,080,255 | 3/1963 | Winkelmann | 117—47 |
| 2,801,648 | 8/1957 | Anderson et al. | |
| 2,955,954 | 10/1960 | Collins. | |
| 3,598,630 | 8/1971 | Doty et al. | |
| 3,616,294 | 10/1971 | Khelghatian et al. | |
| 3,671,301 | 6/1972 | Dahl. | |
| 3,398,042 | 8/1968 | Peter et al. | 161—190 |
| 3,676,180 | 7/1972 | Riess et al. | 117—47 A |
| 3,373,143 | 3/1968 | Chilvers et al. | 260—75 NP |

OTHER REFERENCES

Bayer: "Desmocoll 420" Bulletin KA–4209 (1966).
Tiefenbacher & Co.: "Estane" Bulletin EST–8, (1966).
EPUG "Elastostic" Bulletin, date unknown.

DONALD E. CZAJA, Primary Examiner

H. S. COCKERAM, Assistant Examiner

U.S. Cl. X.R.

117—47 A, 161 KP; 156—331; 161—190; 260—32.2, 75 TN, 77.5 R